US 6,541,578 B2

(12) United States Patent
Pon

(10) Patent No.: US 6,541,578 B2
(45) Date of Patent: Apr. 1, 2003

(54) INCREASED SPACE-TIME YIELD IN GAS PHASE POLYMERIZATION

(75) Inventor: Fou Pon, Calgary (CA)

(73) Assignee: Nova Chemicals (International) S.A. (CH)

( * ) Notice: Subject to any disclaimer, the term of this patent is extended or adjusted under 35 U.S.C. 154(b) by 84 days.

(21) Appl. No.: 09/814,988

(22) Filed: Mar. 22, 2001

(65) Prior Publication Data

US 2003/0027946 A1 Feb. 6, 2003

(51) Int. Cl.$^7$ .................................................. C08F 2/34
(52) U.S. Cl. ............................ 526/68; 526/67; 526/70; 526/88; 526/901; 526/905; 585/326; 585/330
(58) Field of Search ........................ 526/68, 88, 901, 526/67, 70, 905; 585/326, 330

(56) References Cited

U.S. PATENT DOCUMENTS

| | | | | |
|---|---|---|---|---|
| 3,002,963 A | * | 10/1961 | Czenkusch et al. ...... | 526/901 X |
| 3,779,712 A | | 12/1973 | Calvert et al. ................ | 23/288 |
| 4,302,565 A | | 11/1981 | Goeke et al. ................. | 526/88 |
| 4,302,566 A | | 11/1981 | Karol et al. ................. | 526/125 |
| 4,469,855 A | * | 9/1984 | Cooper ................... | 526/901 X |
| 4,543,399 A | | 9/1985 | Jenkins, III et al. .......... | 526/70 |
| 4,588,790 A | | 5/1986 | Jenkins, III et al. .......... | 526/70 |
| 5,352,749 A | | 10/1994 | DeChellis et al. ............ | 526/68 |
| 5,405,922 A | | 4/1995 | De Chellis et al. ........... | 526/68 |
| 5,434,116 A | | 7/1995 | Sone et al. ................. | 502/103 |
| 5,436,304 A | | 7/1995 | Griffin et al. ................. | 526/68 |
| 5,462,999 A | | 10/1995 | Griffin et al. ................. | 526/68 |
| 5,554,775 A | | 9/1996 | Krishnamurti et al. ......... | 556/7 |
| 5,633,419 A | | 5/1997 | Spencer et al. ............. | 585/522 |
| 5,637,659 A | | 6/1997 | Krishnamurti et al. ...... | 526/133 |
| 5,733,987 A | * | 3/1998 | Covezzi et al. ......... | 526/901 X |
| 5,981,818 A | | 11/1999 | Purvis et al. ............... | 585/519 |
| 6,111,156 A | | 8/2000 | Oballa et al. ............... | 585/330 |
| 6,140,264 A | | 10/2000 | Kelly et al. ................. | 502/104 |

FOREIGN PATENT DOCUMENTS

EP  0 595 571 B1  3/1997

* cited by examiner

Primary Examiner—Fred Teskin

(57) ABSTRACT

The space time yield of a gas phase reactor, particularly a polyethylene reactor may be increased by replacing at least 80 weight % of the ballast gas with a gas having a higher heat capacity than the ballast gas. Preferably the gas replacing the ballast gas is a stream of dilute ethylene having a high concentration of ethane.

30 Claims, 1 Drawing Sheet

INCREASED SPACE-TIME YIELD IN GAS PHASE POLYMERIZATION

FIELD OF THE INVENTION

The present invention relates to the polymerization of one or more olefins in a gas phase polymerization process having a low per pass conversion. Typically in gas phase polymerization of olefins the feed stream passes through a fluidized or stirred bed of growing polymer particles. The monomer in the feed stream contacts the catalyst in the growing polymer particles and is polymerized. The unreacted monomer, ballast gas, typically nitrogen, and molecular weight control agent (typically hydrogen) optionally together with a condensable gas are recycled through a compressor and heat exchanger to cool the recycle stream and optionally condense the condensable gases. The recycle stream is then made up with additional feed stream and returned to the bed of growing polymer. The polymerization of olefins is exothermic. In gas phase polymerization the removal of heat from the bed of growing polymer tends to be a rate limiting step, for a given reactor configuration. The present invention seeks to address this issue by replacing at least 80% of the ballast gas in the feed stream with a gas having a higher heat capacity than the ballast gas. The present invention also provides integrating with crackers allowing use of dilute ethylene in a gas phase process.

BACKGROUND OF THE INVENTION

U.S. Pat. Nos. 4,543,399 and 4,588,790 issued to Jenkins, III. et al. Sep. 24, 1985 and May 13, 1986, respectively, assigned to Union Carbide Corporation teach incorporating into the feed stream up to about 20 weight % of the recycle stream of a condensable gas. That is a gas which condenses when a compressed recycle stream passes through a heat exchanger prior to being recycled back to the reactor. Typically these gases are $C_{4-6}$ alkanes, preferably isomers of pentane and hexane. Interestingly, Jenkins does not suggest replacing any portion of the ballast gas with either or both of a condensable gas or a gas having a higher heat capacity.

U.S. Pat. Nos. 5,462,999 and 5,436,304 to Griffin et al. issued Oct. 31, 1995 and Jul. 25, 1995, respectively, and U.S. Pat. Nos. 5,405,922 and 5,352,749 to DeChellis et al. issued Apr. 11, 1995 and Oct. 4, 1994, respectively, all assigned to Exxon Chemical Patents, Inc. all teach operating a gas phase polymerization where in the feed stream may contain from about 17.5 up to 50 weight % of a condensable gas. However, the specification still teaches the feed stream comprises "inerts" preferably nitrogen. No other "inerts" are suggested or disclosed by the above patents. The patents do not suggest that the process could be further enhanced by replacing nitrogen with a gas (which may optionally be condensable) having a higher heat capacity.

U.S. Pat. No. 5,981,818 issued Nov. 9, 1999 to Purvis et al., assigned to Stone & Webster Engineering Corp. teaches the use of dilute ethylene in a number of processes. The dilute ethylene feed may comprise from 1 up to 50 weight % of ethane. One process disclosed is the gas phase polymerization of ethylene. The disclosure cautions that for gas phase processes the dilute ethylene should comprise at least about 95 weight % of ethylene (Col. 9 lines 20–25). This is a higher ethylene content in the feed gas than in accordance with the present invention. That is the feed gas in accordance with the present invention comprises less than 95 weight % of ethylene and the dilute ethylene in accordance with the present invention comprises less than 95 weight % of ethylene.

U.S. Pat. No. 6,111,156 issued Aug. 29, 2000 to Oballa et al. discloses the use of dilute ethylene in an integrated polymerization process which has a high per pass conversion. The high per pass conversion must be greater than 85%. The per pass conversion for conventional gas phase polymerization is typically substantially less than 85% (e.g. 2–10% conversion per pass).

The present invention seeks to provide a process to increase the efficiency of a gas phase polymerization having a low per pass conversion without significantly raising the dew point of the feed stream (i.e. the condensable phase is not greater than about 25 weight %, preferably less than about 20 %, most preferably less than about 17 weight %).

The present invention also seeks to provide a means of integrating a gas phase reactor with an olefin cracker.

SUMMARY OF THE INVENTION

The present invention provides a process to increase the space time yield of a low per pass conversion gas phase polymerization of one or more $C_{2-6}$ alpha olefins comprising replacing not less than 80% of the ballast gas in the feed stream to a gas phase reactor with a gas having a heat capacity greater than the heat capacity of the ballast gas and does not significantly raise the dew point of the feed stream.

DETAILED DESCRIPTION OF THE INVENTION

Figure 1:
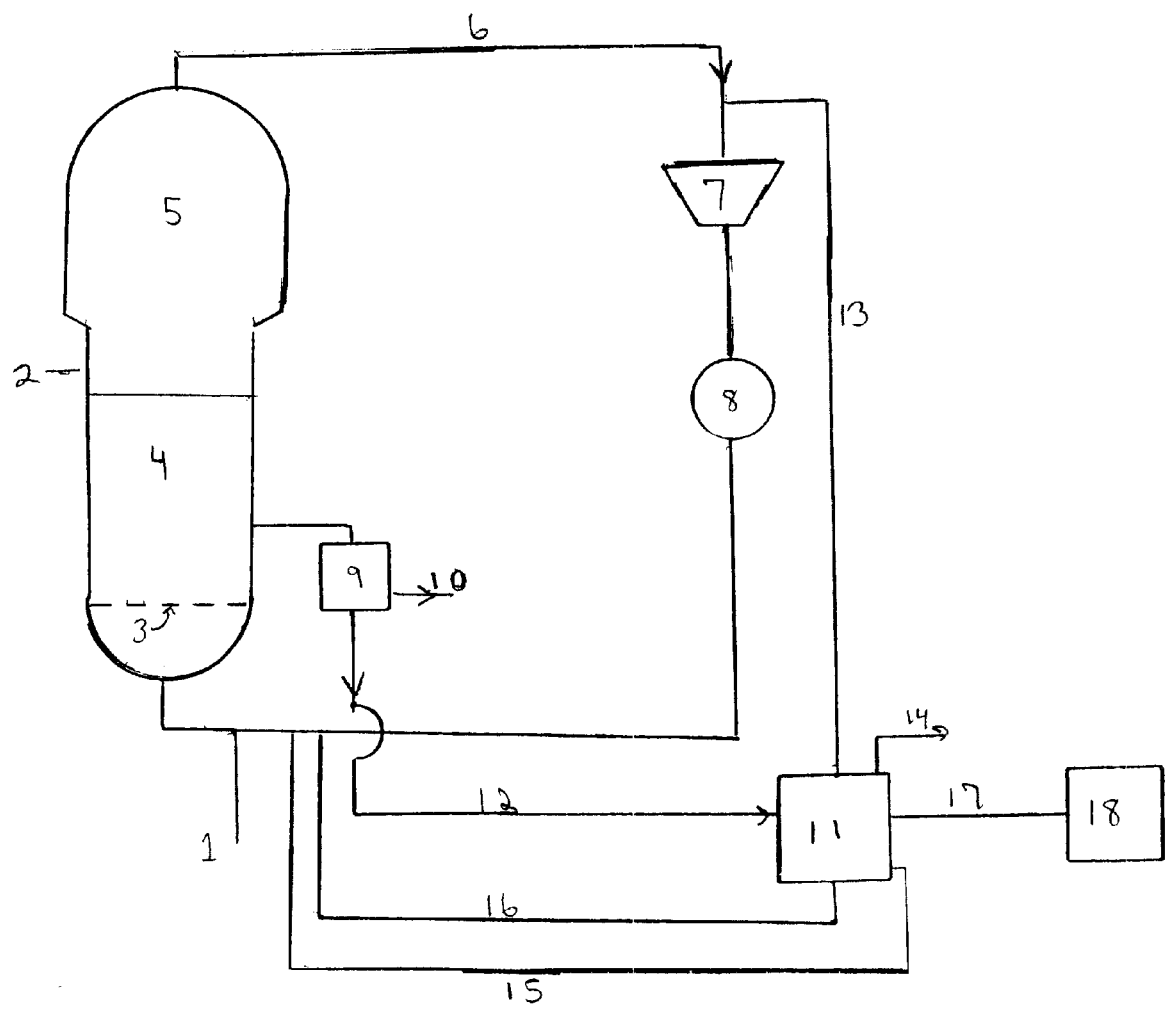
FIG. 1 is a schematic flow diagram of a gas phase polymerization process.

The existing process of the gas phase polymerization of ethylene will be described with reference to FIG. 1.

In the gas phase polymerization of polyethylene a gaseous feed stream 1 comprising ethylene and one or more $C_{3-6}$ copolymerizable monomers typically butene or hexene or both, together with a ballast gas such as nitrogen, optionally a small amount of $C_{1-2}$ alkanes (i.e. methane and ethane) and further optionally a molecular weight control agent (typically hydrogen) is fed to a reactor 2. Typically the feed stream passes through a distributor plate 3 at the bottom of the reactor and traverses a polymer bed 4, typically a fluidized polymer bed. A small proportion of the olefin monomers in the feed stream react with the catalyst. The unreacted monomer and the other non-polymerizable components in the feed stream exit the bed and typically enter a disengagement zone 5 where the velocity of the feed stream is reduced so that entrained polymer falls back into the fluidized bed. Typically the gaseous stream leaving the top of the reactor is then passed through a compressor 7, via recycle line 6. The compressed gas is then cooled through heat exchanger 8 to remove the heat of reaction. The heat exchanger may be operated at temperatures below about 65° C., preferably at temperatures from 20° C. to 50° C.

Polymer is removed from the reactor through a series of vessels 9. The polymer is recovered through line 10 and further processed. The off gases (consisting of monomers and inerts) are fed to a monomer recovery unit 11 via line 12. The monomer recovery unit may be selected from those known in the art including a distillation tower (i.e. a $C_2$ splitter), a pressure swing adsorption unit and a membrane separation device. Additionally, a portion of the stream from the recycle line 6 may be fed to the monomer recovery unit 11 via line 13 to balance the reactor compositions. Monomer/Inerts product from the monomer recovery unit is fed via line 14 to a treatment device, typically a flare stack not shown or partially recycled back to the reactor/discharge system. Heavier components such as $C_{3-5}$ condensable gases etc. are fed back to the reactor via line 15 and recycle line 6. Ethylene and hydrogen gas recovered from the monomer recovery unit are fed back to the reactor via line 16 and recycle line 6. Ethane recovered from the monomer recovery unit is fed via line 17 to a further treatment unit, typically a cracker shown at 18.

Finally, make up feed stream is added via line 1 and recycle line 6 to the reactor 2 below distributor plate 3.

The process is described for example in U.S. Pat. No. 4,543,399 issued Sep. 24, 1985 to Jenkins, III et al. In the Jenkins patent the feed stream may contain up to about 20 weight % of a condensable gas at the conditions in the heat exchanger. That is the temperature, (partial) pressure and concentration of the condensable gas exceed the dew point for the condensable gas and a portion of it condenses to a liquid which is entrained in the recycle gas which is fed back to the reactor (below a distributor plate) and the feed stream with entrained liquids passes through the fluidized bed. As the feed stream passes through the fluidized bed the entrained liquids evaporate and remove some of the heat of reaction from the fluidized bed of catalyst. Some condensable gases include $C_{4-6}$ alkanes (e.g. butane, pentane, isopentane, hexane, cyclohexane, etc.)

If there is no condensable gas, the heat of reaction is removed by heating the gas as it passes through the fluidized bed and cooling it when it passes through the heat exchanger.

The per pass con version of monomer in the feed stream is low, typically less than 10%, generally less than 5%, usually less than about 3%. The reactors a re operated at moderate temperatures typically less than 120° C., generally from about 80° C. to about 115° C., preferably from 80° C. to 110° C. The operating pressures of a gas phase polymerization system may be from about 75 psi (pounds per square inch) to 1200 psi, typically from 100 psi to 1000 psi, preferably from about 100 to 350 psi.

Several types of catalysts may be used in the gas phase polymerization process. The catalyst may be a Ziegler Natta type catalyst. Typically these catalysts comprise a transition metal compound, an aluminum and optionally a zinc compound, a magnesium compound, and optionally an electron donor (Lewis base) on a support.

The Ziegler Natta catalysts typically have the formula $M((O_a)R^1)_bX_c$ wherein M is a transition metal preferably Ti; a is 0 or 1; b and c may be 0 or an integer or contain fractions (i.e. 1.5) and the sum of b and c is the valence of the transition metal 3 or 4; $R^1$ is selected from the group consisting of $C_{1-8}$, preferably a $C_{1-4}$ alkyl radical; and X is a halogen atom preferably chloride. One useful titanium compound is $TiCl_4$.

The aluminum compound is typically an aluminum alkyl or alkoxide complex or an aluminum alkyl halide. These compounds may be characterized by the formula $Al ((O)_aR^1)_dX_e$ wherein a, $R^1$, and X are as defined above and the sum of d and e is 3. While it may be preferred that d and e are integers they may be or contain fractions (i.e. 1.5). Such compounds include triethyl aluminum (TEAL), trimethyl aluminum (TMA), diethyl aluminum chloride (DEAC), tri-n-hexyl aluminum (TNHAL), aluminum sesquichloride and mixtures thereof.

The zinc compounds if present is typically a zinc halide such as zinc chloride ($ZnCl_2$).

The magnesium compound may be a magnesium halide ($MgCl_2$), a magnesium alkyl compound ($R^1MgX$ wherein $R^1$ and X are as defined above) or a dialkyl magnesium compound (i.e. $(R^1)_2Mg$ where $R^1$ is as defined above). As the magnesium halides tend to be insoluble in organic solvents they are typically dissolved as a dialkyl magnesium compound (i.e. diethyl magnesium or butyl ethyl magnesium) and then reacted with halide (typically an organic halide such as $R^1X$ wherein $R^1$ and X are as defined above) to produce a fine suspension of $MgCl_2$.

Optionally the Ziegler Natta catalyst may contain an electron donor (Lewis base). Typically the electron donors are ethers which typically may contain up to about 8 carbon atoms (e.g. $R^1$—O—$R^1$). The ethers may be acyclic composed of two aliphatic radicals joined through an oxygen atom (diethyl ether) or they may be cyclic ethers such as tetrahydrofuran. Tetrahydrofuran is a commercially available electron donor. If present the electron donor may be present in amounts to provide a molar ratio of electron donor to transition metal up to about 50:1, preferably less than about 25:1, most preferably from about 5:1 to about 15:1.

The catalysts are supported. The supports useful in accordance with the present invention typically comprise a substrate of aluminum or silica having a pendant reactive moiety. The reactive moiety may be a siloxy radical or more typically is a hydroxyl radical. The preferred support is silica or alumina. The support should have a particle size from about 10 to 250 microns, preferably from about 30 to 150 microns. The support should have a large surface area typically greater than about 3 $m^2$/g, preferably greater than about 50 $m^2$/g, most preferably from 100 $m^2$/g to 1,000 $m^2$/g. The support will be porous and will have a pore volume from about 0.3 to 5.0 ml/g, typically from 0.5 to 3.0 ml/g. Supports, which are specifically designed to be an agglomeration of subparticles are also useful.

It is important that the support be dried prior to the initial reaction with the catalyst or a catalyst component such as an aluminum compound. Generally the support may be heated at a temperature of at least 200° C. for up to 24 hours, typically at a temperature from 500° C. to 800° C. for times from about 2 to 20 hours. The resulting support will be free of adsorbed water and should have a surface hydroxyl content from about 0.1 to 5 mmol/g of support, preferably from 0.5 to 3 mmol/g.

Optionally the aluminum compound may be added as a "split addition". That is a portion of the aluminum is added to the support and a portion is added to the catalyst at a later stage. A first aluminum compound ($Al^1$) may be deposited upon the support by contacting the support, preferably silica with an anhydrous solution of an aluminum compound as defined above wherein a is 0. Most preferably, $R^1$ is selected from the group consisting of methyl, ethyl and butyl radicals. Preferably, c is 0. From a commercial viewpoint, an available compound is triethylaluminum (TEAL).

The support is reacted with an aluminum compound such that the amount of aluminum on the support is from about 0.1 to about 3 weight %, preferably from about 0.5 to about 2 weight %, based on the weight of the silica.

The molar ratios of Mg:Al:Ti may vary over wide ranges depending on the balance of properties required in the catalyst and in the resulting polymer.(e.g. molecular weight, melt index, felt flow ratio etc.). U.S. Pat. No. 4,302,566 issued Nov. 24, 1981 to Karol et al. and U.S. Pat. No. 4,302,565 issued Nov. 24, 1981 to Goeke et al., both assigned to Union Carbide Corporation, teach a molar ratio of Mg:Ti:Al of 0.5 to 56, preferably 1 to 10:1:10 to 400, preferably 10 to 100. Other references which teach catalysts or their process of manufacture include U.S. Pat. No.

6,140,264 issued Oct. 31, 2000 to Kelly et al; U.S. Pat. No. 5,633,419 issued May 27, 1997 to Spencer and European Patent 0 595 571 granted Jan. 2, 1997 assigned to BP (the texts of which are herein incorporated by reference).

The catalyst may be activated with a co-catalyst, typically an aluminum alkyl compound as described above wherein a is 0. The catalyst is fed to a fluidized bed gas phase reactor. U.S. Pat. No. 4,543,399 issued Sep. 24, 1985 to Jenkins, III. et al. (assigned to Union Carbide Corporation) teaches it is particularly preferred to continuously feed catalyst to the reactor using the device of U.S. Pat. No. 3,779,712 (issued Dec. 18, 1973 to Calvert et al. also assigned to Union Carbide Corporation, now expired).

The catalyst may be a chrome base catalyst, typically $CrO_3$ on a support as described above.

The catalyst may be a single site type catalyst typically comprising a transition metal, preferably an early transition metal (e.g. Ti, V, Zr and Hf) and generally having two bulky ligands. In many of the well known single site catalysts typically one of the bulky ligands is a cyclopentadienyl-type ligand. These cyclopentadienyl-type ligands comprise a $C_{5-13}$ ligand containing a 5-membered carbon ring having delocalized bonding within the ring and bound to the metal atom through covalent $\eta^5$ bonds which are unsubstituted or may be further substituted (sometimes referred to in a short form as Cp ligands). Cyclopentadienyl-type ligands include unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl-type ligand includes the group consisting of $C_{1-10}$ hydrocarbyl radicals (including phenyl and benzyl radicals), which hydrocarbyl substituents are unsubstituted or further substituted by one or more substituents selected from the group consisting of a halogen atom, preferably a chlorine or fluorine atom and a $C_{1-4}$ alkyl radical; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from the group consisting of hydrogen, a $C_{1-8}$ alkyl or alkoxy radical, and $C_{6-10}$ aryl or aryloxy radicals; and germanyl radicals of the formula Ge—$(R)_3$ wherein R is as defined directly above.

If there are two such bulky ligands (i.e. bis Cp) the catalysts are metallocene-type catalysts. The Cp ligand may be bridged to another Cp ligand by a silyl bridge or a short chain $(C_{1-4})$ alkyl radical. The Cp-type ligand may be bridged to an amido radical which may be further substituted by up to two additional substituents. Such bridged complexes are sometimes referred to as constrained geometry catalysts.

Broadly, the transition metal complex (or catalyst) suitable for use in the present invention has the formula:

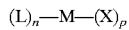

wherein M is a transition metal preferably selected from Ti, Hf and Zr (as described below); L is a monanionic ligand selected from the group consisting of a cyclopentadienyl-type ligand, a bulky heteroatom ligand (as described below) and a phosphinimine ligand (as described below); X is an activatable ligand which is most preferably a simple monanionic ligand such as alkyl or a halide (as described below); n may be from 1 to 3, preferably 2 or 3; and p may be from 1 to 3, preferably 1 or 2, provided that the sum of n+p equals the valence state of M, and further provided that two L ligands may be bridged by a silyl radical or a $C_{1-4}$ alkyl radical.

If one or more of the L ligands is a phosphinimine ligand the transition metal complex may be of the formula:

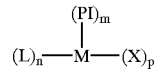

wherein M is a transition metal preferably selected from Ti, Hf and Zr (as described below); Pl is a phosphinimine ligand (as described below); L is a monanionic ligand selected from the group consisting of a cyclopentadienyl-type ligand or a bulky heteroatom ligand (as described below); X is an activatable ligand which is most preferably a simple monanionic ligand such as an alkyl or a halide (as described below); m is 1 or 2; n is 0 or 1; and p is an integer fixed by the valence of the metal M (i.e. the sum of m+n+p equals the valence state of M).

In one embodiment the catalysts are group 4 metal complexes in the highest oxidation state. For example, the catalyst may be a bis (phosphinimine) dichloride complex of titanium, zirconium or hafnium. Alternately, the catalyst contains one phosphinimine ligand, one "L" ligand (which is most preferably a cyclopentadienyl-type ligand) and two "X" ligands (which are preferably both chloride).

The preferred metals (M) are from Group 4, (especially titanium, hafnium or zirconium) with titanium being most preferred.

The catalyst may contain one or two phosphinimine ligands which are covalently bonded to the metal. The phosphinimine ligand is defined by the formula:

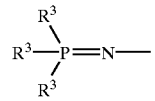

wherein each $R^3$ is independently selected from the group consisting of a hydrogen atom; a halogen atom; $C_{1-20}$, preferably $C_{1-10}$ hydrocarbyl radicals which are unsubstituted by or further substituted by a halogen atom; a $C_{1-8}$ alkoxy radical; a $C_{6-10}$ aryl or aryloxy radical; an amido radical; a silyl radical of the formula:

wherein each $R^2$ is independently selected from the group consisting of hydrogen, a $C_{1-8}$ alkyl or alkoxy radical, and $C_{6-10}$ aryl or aryloxy radicals; and a germanyl radical of the formula:

wherein $R^2$ is as defined above.

The preferred phosphinimines are those in which each $R^3$ is a hydrocarbyl radical, preferably a $C_{1-6}$ hydrocarbyl radical. A particularly preferred phosphinimine is tri-(tertiary butyl) phosphinimine (i.e. wherein each $R^3$ is a tertiary butyl group).

Preferred phosphinimine catalysts are Group 4 organometallic complexes which contain one phosphinimine ligand (as described above) and one ligand L which is either a cyclopentadienyl-type ligand or a heteroligand.

As used herein, the term "heteroligand" refers to a ligand which contains at least one heteroatom selected from the group consisting of boron, nitrogen, oxygen, phosphorus or sulfur. The heteroligand may be sigma or pi-bonded to the metal. Exemplary heteroligands include ketimide ligands, silicone-containing heteroligands, amido ligands, alkoxy ligands, boron hetrocyclic ligands and phosphole ligands, all as described below.

As used herein, the term "ketimide ligand" refers to a ligand which:

(a) is bonded to the transition metal via a metal-nitrogen atom bond;

(b) has a single substituent on the nitrogen atom (where this single substituent is a carbon atom which is doubly bonded to the N atom); and (c) has two substituents Sub 1 and Sub 2 (described below) which are bonded to the carbon atom.

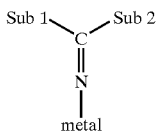

The substituents "Sub 1" and "Sub 2" may be the same or different. Exemplary substituents include hydrocarbyls having from 1 to 20 carbon atoms, silyl groups, amido groups and phosphido groups. For reasons of cost and convenience it is preferred that these substituents both be hydrocarbyls, especially simple alkyls and most preferably tertiary butyl.

Silicon containing heteroligands are defined by the formula:

wherein the—denotes a bond to the transition metal and $\mu$ is sulfur or oxygen.

The substituents on the Si atom, namely $R_x$, $R_y$ and $R_z$ are required in order to satisfy the bonding orbital of the Si atom. The use of any particular substituent $R_x$, $R_y$ or $R_z$ is not especially important to the success of this invention. It is preferred that each of $R_x$, $R_y$ and $R_z$ is a $C_{1-2}$ hydrocarbyl group (i.e. methyl or ethyl) simply because such materials are readily synthesized from commercially available materials.

The term "amido" is meant to convey its broad, conventional meaning. Thus, these ligands are characterized by (a) a metal-nitrogen bond and (b) the presence of two substituents (which are typically simple alkyl or silyl groups) on the nitrogen atom.

The terms "alkoxy" and "aryloxy" is also intended to convey its conventional meaning. Thus, these ligands are characterized by (a) a metal oxygen bond and (b) the presence of a hydrocarbyl group bonded to the oxygen atom. The hydrocarbyl group may be a $C_{1-10}$ straight chained, branched or cyclic alkyl radical or a $C_{6-13}$ aromatic radical which radicals are unsubstituted or further substituted by one or more $C_{1-4}$ alkyl radicals (e.g. 2,6 di-tertiary butyl phenoxy).

Boron heterocyclic ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659; 5,554,775 and the references cited therein).

The term "phosphole" is also meant to convey its conventional meaning. "Phospholes" are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; or silyl or alkoxy radicals. Phosphole ligands are also well known to those skilled in the art of olefin polymerization and are described as such in U.S. Pat. No. 5,434,116 (Sone, to Tosoh).

The term "activatable ligand" or "leaving ligand" refers to a ligand which may be activated by the alumoxane (also referred to as an "activator") to facilitate olefin polymerization. Exemplary activatable ligands are independently selected from the group consisting of a hydrogen atom; a halogen atom, preferably a chlorine or fluorine atom; a $C_{1-10}$ hydrocarbyl radical, preferably a $C_{1-4}$ alkyl radical; a $C_{1-10}$ alkoxy radical, preferably a $C_{1-4}$ alkoxy radical; and a $C_{5-10}$ aryl oxide radical; each of which said hydrocarbyl, alkoxy, and aryl oxide radicals may be unsubstituted by or further substituted by one or more substituents selected from the group consisting of a halogen atom, preferably a chlorine or fluorine atom; a $C_{1-8}$ alkyl radical, preferably a $C_{1-4}$ alkyl radical; a $C_{1-8}$ alkoxy radical, preferably a $C_{1-4}$ alkoxy radical; a $C_{6-10}$ aryl or aryloxy radical; an amido radical which is unsubstituted or substituted by up to two $C_{1-8}$, preferably $C_{1-4}$ alkyl radicals; and a phosphido radical which is unsubstituted or substituted by up to two $C_{1-8}$, preferably $C_{1-4}$ alkyl radicals.

The number of activatable ligands depends upon the valence of the metal and the valence of the activatable ligand. The preferred catalyst metals are Group 4 metals in their highest oxidation state (i.e. 4$^+$) and the preferred activatable ligands are monoanionic (such as a halide—especially chloride, or $C_{1-4}$ alkyl—especially methyl). One useful group of catalysts contain a phosphinimine ligand, a cyclopentadienyl ligand and two chloride (or methyl) ligands bonded to the Group 4 metal. In some instances, the metal of the catalyst component may not be in the highest oxidation state. For example, a titanium (III) component would contain only one activatable ligand.

As noted above, one group of catalysts is a Group 4 organometallic complex in its highest oxidation state having a phosphinimine ligand, a cyclopentadienyl-type ligand and two activatable ligands. These requirements may be concisely described using the following formula for the preferred catalyst:

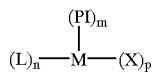

wherein: M is a metal selected from Ti, Hf and Zr; Pl is as defined above, but preferably a phosphinimine wherein $R^3$ is a $C_{1-6}$ alkyl radical, most preferably a t-butyl radical; L is a ligand selected from the group consisting of cyclopentadienyl, indenyl and fluorenyl ligands which are unsubstituted or substituted by one or more substituents selected from the group consisting of a halogen atom, preferably chlorine or fluorine; $C_{1-4}$ alkyl radicals; and benzyl and phenyl radicals which are unsubstituted or substituted by one or more halogen atoms, preferably fluorine; X is selected from the group consisting of a chlorine atom and $C_{1-4}$ alkyl radicals; m is 1; n is 1; and p is 2.

In one embodiment of the present invention the transition metal complex may have the formula: $[(CP)_qM[N=P(R^3)]_pX_g$ wherein M is the transition metal; Cp is a $C_{5-13}$ ligand containing a 5-membered carbon ring having delocalized bonding within the ring and bound to the metal atom through covalent η⁵ bonds and said ligand being unsubstituted or up to fully substituted with one or more substituents selected from the group consisting of a halogen atom, preferably chlorine or fluorine; $C_{1-4}$ alkyl radicals; and benzyl and phenyl radicals which are unsubstituted or substituted by one or more halogen atoms, preferably flurorine; $R^3$ is a substituent selected from the group consisting of $C_{1-10}$ straight chained or branched alkyl radicals, $C_{6-10}$ aryl and aryloxy radicals which are unsubstituted or may be substituted by up to three $C_{1-4}$ alkyl radicals, and silyl radicals of the formula —Si—(R)₃ wherein R is $C_{1-4}$ alkyl radical or a phenyl radical; L is selected from the group consisting of a leaving ligand; q is 1 or 2; f is 1 or 2; and the valence of the transition metal–(q+f)=g.

The activator may be selected from the group consisting of:
(i) an aluminoxane; and
(ii) an activator capable of ionizing the transition (Group 4) metal complex (which may be used in combination with an alkylating activator).

The single site catalysts may be activated using alumoxanes. Alumoxanes have the formula $(R^4)_2AlO(R^4AlO)_mAl(R^4)_2$ wherein each $R^4$ is independently selected from the group consisting of $C_{1-20}$ hydrocarbyl radicals, m is from 3 to 50. Preferably m is from 5 to 30. Most preferably $R^4$ is selected from the group consisting of $C_{1-6}$, most preferably $C_{1-4}$ straight chained or branched alkyl radicals. Suitable alkyl radicals include a methyl radical, an ethyl radical, an isopropyl radical and an isobutyl radical. In some commercially available alumoxanes $R^4$ is a methyl radical.

The catalyst useful in accordance with the present invention may have a molar ratio of aluminum from the alumoxane to transition metal from 5 to 300: 1, preferably from 25 to 200:1, most preferably from 50 to 120:1. Typically the alumoxane loading on the support will be from 1 to 40 weight % based on the (weight of the) support, preferably from 2 to 30 weight % based on the (weight of the) support, most preferably from 5 to 20 weight % based on the (weight of the) support. The corresponding loading of transition metal from the single site catalyst will be within the above specified ratio of Al:transition metal. Generally the loading of transition metal on the support will be from 0.01 to 5 weight % based on the (weight of the) support, preferably from 0.05 to 2 weight % of transition metal based on the (weight of the) support, most preferably from 0.1 to 1 weight % of transition metal based on the (weight of the) support.

An activator capable of ionizing the transition metal complex may be selected from the group consisting of:
(i) compounds of the formula $[R^5]^+[B(R^7)_4]^-$ wherein B is a boron atom, $R^5$ is a cyclic $C_{5-7}$ aromatic cation or a triphenyl methyl cation and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^9)_3$; wherein each $R^9$ is independently selected from the group consisting of a hydrogen atom and a $C_{1-4}$ alkyl radical; and
(ii) compounds of the formula $[(R^8)_tZH]^+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and
iii) compounds of the formula $B(R^7)_3$ wherein $R^7$ is as defined above.

In the above compounds preferably $R^7$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

The activator capable of ionizing the transition metal complex abstract one or more $L^1$ ligands so as to ionize the transition metal center into a cation but not to covalently bond with the transition metal and to provide sufficient distance between the ionized transition metal and the ionizing activator to permit a polymerizable olefin to enter the resulting active site. In short the activator capable of ionizing the transition metal complex maintains the transition metal in a +1 valence state, while being sufficiently liable to permit its displacement by an olefin monomer during polymerization.

Examples of compounds capable of ionizing the transition metal complex include the following compounds:
triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-diethylanilinium tetra(phenyl)boron,
N,N-diethylanilinium tetra(phenyl)n-butylboron,
N,N-2,4,6-pentamethylanilinium tetra(phenyl)boron,
di-(isopropyl)ammonium tetra(pentafluorophenyl)boron,
dicyclohexylammonium tetra(phenyl)boron
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene (diazonium) tetrakispentafluorophenyl borate,
tropillium phenyltris-pentafluorophenyl borate,
triphenylmethylium phenyl-trispentafluorophenyl borate,
benzene (diazonium) phenyltrispentafluorophenyl borate,
tropillium tetrakis (2,3,5,6-tetrafluorophenyl) borate,
triphenylmethylium tetrakis (2,3,5,6-tetrafluorophenyl) borate,
benzene (diazonium) tetrakis (3,4,5-trifluorophenyl) borate,
tropillium tetrakis (3,4,5-trifluorophenyl) borate,
benzene (diazonium) tetrakis (3,4,5-trifluorophenyl) borate,
tropillinum tetrakis (1,2,2-trifluoroethenyl) borate,
triphenylmethylium tetrakis (1,2,2-trifluoroethenyl) borate,
benzene (diazonium) tetrakis (1,2,2-trifluoroethenyl) borate,
tropillium tetrakis (2,3,4,5-tetrafluorophenyl) borate, triphenylmethylium tetrakis (2,3,4,5-tetrafluorophenyl) borate, and benzene (diazonium) tetrakis (2,3,4,5-tetrafluorophenyl) borate.

Readily commercially available activators which are capable of ionizing the transition metal complexes include:

N,N- dimethylaniliniumtetrakispentafluorophenyl borate;

triphenylmethylium tetrakispentafluorophenyl borate; and trispentafluorophenyl boron.

If the transition (e.g. Group 4) metal complex is activated with a combination of an aluminum alkyl compound other than aluminoxane and a compound capable of ionizing the transition metal complex the molar ratios of transition metal:metal in the aluminum alkyl compound; metalloid (i.e. boron or phosphorus) in the activator capable of ionizing the transition metal complex (e.g. boron) may range from 1:0:1 to 1:10:5.

In accordance with the present invention at least a significant portion, preferably not less than 80%, most preferably not less than 95%, desirably not less than 98% of the ballast gas in the feed stream is replaced with a gas having a heat capacity greater than that of the ballast gas. In one embodiment of the invention the gas replacing the ballast gas contains less than 5%, preferably less than 2.5% and most preferably no gas which is condensable to a liquid when the compressed feed stream passes through the heat exchanger.

In one embodiment of the invention the gas replacing the ballast gas in the feed stream is a source of dilute or unpurified ethylene. The stream replacing the ballast stream may be a stream from an ethylene cracker which has only been treated to remove the methane and the hydrocarbons having more than 6 carbon atoms. Typically such a stream comprises 75% to 95% of ethylene and from 25 to 2.2 weight % of ethane and from 0 to 2.5 weight % of one or more non-polymerizable $C_{3-5}$ gases condensable at temperatures from 20° C. to 50° C. at the pressures of the heat exchanger for the recycle stream.

The gas replacing the ballast gas may comprise from 10 to 50% of the feed stream. As a result the feed stream may comprise, in addition to the gas replacing the ballast gas from 0 to 20 weight % of one or more $C_{4-6}$ alpha olefins; from 0 to 25 weight % of one or more additional non-polymerizable $C_{3-5}$ gases condensable at temperatures from 20° C. to 50° C. at the pressures of the heat exchanger for the recycle stream; and from 0 to 1.0 weight % of hydrogen. The resulting feed stream may also comprise up to 0.5 weight % of nitrogen. Compared to the feed stream having ballast gas, the feed stream in accordance with the present invention may comprise up to an additional 42.5 weight % of ethane and up to about an additional 50 weight % of ethylene.

Overall the feed stream of the present invention comprises from 30 to 75, preferably from 30 to 50 weight % of ethylene, from 20 to 50, preferably from 24 to 50 weight % of ethane, from 0 to 20 weight % of one or more $C_{4-6}$ copolymerizable alpha olefins, from 0 to 25 weight % of one or more $C_{3-5}$ gases condensable at temperatures from 20° C. to 50° C. at the pressures of the heat exchanger for the recycle stream and from 0 to 1 weight % of hydrogen the sum of the components being selected to add up to 100 weight % of the feed stream.

Preferably the feed stream of the present invention comprises from 35 to 45 weight % of ethylene, from 50 to 24 weight % of ethane, from 10 to 20 weight % of one or more copolymerizable alpha olefins selected from the group consisting of butene and hexene, from 10 to 20 weight % of one or more $C_{3-5}$ gases condensable at temperatures from 20° C. to 50° C. at the pressures of the heat exchanger for the recycle stream and from 0 to 1 weight % of hydrogen.

The process of the present invention may be operated in "condensing mode". Accordingly, the process may further comprise recovering recycle feed stream from the reactor and from the monomer recovery loop and compressing the feed stream and passing the resulting compressed feed stream through a heat exchanger to condense that portion of the feed stream condensable at temperatures (e.g. from 20° C. to 50° C.) and the pressures of the heat exchanger for the recycle stream. One may then recycle to the gas phase polymerization reactor that portion of the condensed recycle stream to keep the amount of liquids entrained in the gas phase constant within process control limits.

In accordance with the present invention the ethane may be recovered from the recycle stream, preferably after it is compressed. The ethane may be recovered using a number of technologies such as a $C_2$ splitter (a distillation tower capable of separating ethane from ethylene) a pressure swing adsorption unit, or a membrane separation unit. At least a part, and preferably all of the separated and/or recovered ethylene and/or hydrogen from the recycle stream is fed back to the gas phase polymerization reactor. Preferably at least a part, most preferably not less than 85%, desirably not less than 95 weight % of the ethane recovered from the feed stream is recycled to an ethylene cracker.

The present invention is particularly suitable for use in a turnkey chemical complex where there is a cracker (either ethane or oil or naphtha) and a gas phase polyethylene plant. Accordingly it is not necessary to significantly purify the ethylene prior to polymerization and the recovered ethane from the recycle stream can be recycled directly back to the cracker.

The present invention will now be illustrated by the following example.

EXAMPLE 1

Example 1 is a computer generated analysis showing the mass balance in a process according to the present invention and the prior art in accordance with FIG. 1 in which the monomer recovery unit is $C_2$ splitter. The computer model used to generate the data is used and correctly predicts the mass balance in a commercially operated gas phase polyethylene plant of NOVA Chemicals Corporation.

In the computer model the feed stream comprised 26,746 kg of ethylene per hour; 1,511 kg/hour of comonomer; 0.973 kg/hr of hydrogen and 1,542 kg/hr of nitrogen. The vent off the recycle stream was 153 kg per hour. A stream of purge gas to the polymer discharge system was 1,324 kg/hour. The monomer recovery unit had an output of 1,944 kg/hr of gas which can be returned to the reactor or vented to flare. Liquids at a rate of 1,775 kg/hour are sent back to the reactor. The output of polymer was 29,550 kg/hr.

The computer simulation was then re-run using a condensed mode (e.g. in accordance with U.S. Pat. No. 4,543, 399 to Jenkins, III et al. and replacing all of the ballast gas ($N_2$) with ethane and also running in dry mode (no condensable gas) and replacing the ballast gas with ethane.

The results are set forth in Table 1 below.

TABLE 1

|  | Condensed Mode Rate Improvements | | Dry Mode Rate Improvements | |
|---|---|---|---|---|
|  | Simulation With Nitrogen (Prior Art) | Simulation With Ethane Replacing Nitrogen (Invention) | Simulation With Nitrogen in Dry Mode (Prior Art) | Simulation With Ethane in Dry Mode (Invention) |
| Molar Composition |  |  |  |  |
| Ethylene | 0.3346 | 0.3340 | 0.3338 | 0.3337 |
| 1-Hexene | 0.03838 | 0.03831 | 0.03830 | 0.03828 |
| Hydrogen | 0.04601 | 0.04593 | 0.04591 | 0.04589 |
| Nitrogen | 0.4795 | 0.0000 | 0.5120 | 0 |
| Condensable Gas | 0.03175 | 0.04838 | 0 | 0 |
| Ethane | 0.06968 | 0.5333 | 0.06996 | 0.5821 |
| Weight % Liquids | 7.00 | 7.00 | 0.000 | 0.000 |
| Production Rate | 29550 | 35727 | 14252 | 21552 |

The results from Table 1 show that in condensing mode of operation the increase in productivity when replacing all of the nitrogen with essentially ethane is about 20%. More impressive is the result in the dry mode of operation (i.e. no condensable gas) which shows an increase in productivity of about 50%.

What is claimed is:

1. A process to increase the space time yield of a gas phase polymerization of one or more $C_{2-6}$ alpha olefins having a per pass conversion of less than 5% of alpha olefin to polyolefin with gas passing through a reactor and being cycled through a heat exchanger and back to the reactor being operated at a temperature of from 80° C. to 115° C. and a pressure from 100 psi to 1000 psi in the presence of a catalyst selected from the group consisting of Ziegler Natta catalysts and transition metal complexes containing at least one $C_{5-13}$ ligand selected from the group consisting of a cyclopentadienyl radical, an indenyl radical and a fluorenyl radical which are unsubstituted or further substituted by up to the number of available carbon atoms with substituents selected from the group consisting of a halogen atom, and $C_{1-4}$ alkyl radicals, and mixtures thereof said transition metal complex having been activated with an aluminoxane or an activator capable of ionizing the transition metal complex in which process not less than 80 weight % of the ballast gas in the feed stream to a gas phase reactor is replaced with a gas comprising from 75 weight % to 95 weight % of ethylene; from 25 to 2.2 weight % of ethane and from 0 to 2.5 weight % of one or more non-polymerizable $C_{3-5}$ gases condensable at temperatures from 20° C. to 50° C. at the pressures of the heat exchanger for the recycle stream.

2. The process according to claim 1, wherein the gas replacing the ballast gas comprises from 10 to 50 weight % of the gas in the feed stream.

3. The process according to claim 2, wherein the feed stream further comprises from 0 to 20 weight % of one or more $C_{4-6}$ alpha olefins; from 0 to 25 weight % of one or more additional non-polymerizable $C_{3-5}$ gases condensable at temperatures from 20° to 65° C. at pressures of the heat exchanger for the recycle stream; and from 0 to 1.0 weight % of hydrogen.

4. The process according to claim 3, wherein the feed stream further comprises up to 0.5 weight % of nitrogen.

5. The process according to claim 4, wherein the feed stream furthers comprises up to 42.5 weight % of additional ethane.

6. The process according to claim 5, wherein the feed stream further comprises up to 50 weight % of additional ethylene.

7. The process according to claim 6, wherein the stream replacing the ballast stream is a stream from an ethylene cracker which has only been treated to remove the methane and hydrocarbons having more than 6 carbon atoms.

8. The process according to claim 7, further comprising passing at least part of the recycle stream from the reactor through a heat exchanger to condense that portion of the recycle stream condensable at temperatures from 20° C. to 65° C. at the pressures of the heat exchanger.

9. The process according to claim 8, further comprising recycling to the gas phase polymerization reactor a portion of the condensed recycle stream to keep the amount of liquids entrained in the gas phase constant within process control limits.

10. The process according to claim 9, further comprising passing a portion of the uncondensed recycle stream through a pressure swing adsorption unit to remove ethane from the stream.

11. The process according to claim 10, further comprising recycling at least a portion of the ethane removed from the uncondensed recycle stream to an ethylene cracker.

12. The process according to claim 11, further comprising recycling at least a part of the ethylene, hydrogen or both recovered from the uncondensed recycle stream to the gas phase reactor.

13. The process according to claim 9, further comprising passing a portion of the uncondensed recycle stream through a $C_2$ splitter to remove ethane from the stream.

14. The process according to claim 13, further comprising recycling at least a portion of the ethane removed from the uncondensed recycle stream to an ethylene cracker.

15. The process according to claim 14, further comprising recycling at least a part of the ethylene, hydrogen or both recovered from the uncondensed recycle stream to the gas phase reactor.

16. The process according to claim 9, further comprising passing a portion of the uncondensed recycle stream through a membrane separation unit to remove ethane from the stream.

17. The process according to claim 13, further comprising recycling the ethane removed from the compressed uncondensed recycle stream to an ethylene cracker.

18. The process according to claim 14, further comprising recycling at least a part of the ethylene, hydrogen or both recovered from the compressed uncondensed recycle stream to the gas phase reactor.

19. The process according to claim 12, wherein the catalyst is a Ziegler Natta catalyst.

20. The process according to claim 15, wherein the catalyst is a Ziegler Natta catalyst.

21. The process according to claim 18, wherein the catalyst is a Ziegler Natta catalyst.

22. The process according to claim 12, wherein the catalyst is a transition metal complex containing at least one $C_{5-13}$ ligand selected from the group consisting of a cyclopentadienyl radical, an indenyl radical and a fluorenyl radical which are unsubstituted or further substituted by up to the number of available carbon atoms with substitutents selected from the group consisting of a halogen atom, and $C_{1-4}$ alkyl radicals, and mixtures thereof.

23. The process according to claim 15, wherein the catalyst is a transition metal complex containing at least one $C_{5-13}$ ligand selected from the group consisting of a cyclopentadienyl radical, an indenyl radical and a fluorenyl radical which are unsubstituted or further substituted by up to the number of available carbon atoms with substitutents selected from the group consisting of a halogen atom, and $C_{1-4}$ alkyl radicals, and mixtures thereof.

24. The process according to claim 18, wherein the catalyst is a transition metal complex containing at least one $C_{5-13}$ ligand selected from the group consisting of a cyclopentadienyl radical, an indenyl radical and a fluorenyl radical which are unsubstituted or further substituted by up to the number of available carbon atoms with substitutents selected from the group consisting of a halogen atom, and $C_{1-4}$ alkyl radicals, and mixtures thereof.

25. The process according to claim 22, wherein said activator is an aluminoxane of the formula $R^4{}_2AlO(R^4AlO)_mAlR^4{}_2$ wherein each $R^4$ is independently selected from the group consisting of $C_{1-4}$ hydrocarbyl radicals and m is from 5 to 30 and is present in an amount to provide a molar ratio of aluminum to transition metal from 50:1 to 1000:1.

26. The process according to claim 23, wherein said activator is an aluminoxane of the formula $R^4{}_2AlO(R^4AlO)_mAlR^4{}_2$ wherein each $R^4$ is independently selected from the group consisting of $C_{1-4}$ hydrocarbyl radicals and m is from 5 to 30 and is present in an amount to provide a molar ratio of aluminum to transition metal from 50:1 to 1000:1.

27. The process according to claim 24, wherein said activator is an aluminoxane of the formula $R^4{}_2AlO(R^4AlO)_mAlR^4{}_2$ wherein each $R^4$ is independently selected from the group consisting of $C_{1-4}$ hydrocarbyl radicals and m is from 5 to 30 and is present in an amount to provide a molar ratio of aluminum to transition metal from 50:1 to 1000:1.

28. The process according to claim 22, wherein said activator is capable of ionizing the transition metal complex selected from the group consisting of:
   (i) compounds of the formula $[R^5]^+[B(R^7)_4]^-$ wherein $R^5$ is a cyclic $C_{5-7}$ aromatic cation or a triphenyl methyl cation and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula $—Si—(R^9)_3$; wherein each $R^9$ is independently selected from the group consisting of a hydrogen atom and a $C_{1-4}$ alkyl radical;
   (ii) compounds of the formula $[(R^8)_tZH]^+[B(R^7)_4]^-$ wherein H is a hydrogen atom, Z is a nitrogen atom or phosphorus atom, t is 2 or 3 and Z is nitrogen or phosphorus and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and
   (iii) compounds of the formula $B(R^7)_3$ wherein $R^7$ is as defined above.

29. The process according to claim 23, wherein said activator is capable of ionizing the transition metal complex selected from the group consisting of:
   (i) compounds of the formula $[R^5]^+[B(R^7)_4]^-$ wherein $R^5$ is a cyclic $C_{5-7}$ aromatic cation or a triphenyl methyl cation and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula $—Si—(R^9)_3$; wherein each $R^9$ is independently selected from the group consisting of a hydrogen atom and a $C_{1-4}$ alkyl radical;
   (ii) compounds of the formula $[(R^8)_tZH]^+[B(R^7)_4]^-$ wherein H is a hydrogen atom, Z is a nitrogen atom or phosphorus atom, t is 2 or 3 is Z is nitrogen or phosphorus and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and
   (iii) compounds of the formula $B(R^7)_3$ wherein $R^7$ is as defined above.

30. The process according to claim 24, wherein said activator is capable of ionizing the transition metal complex selected from the group consisting of:
   (i) compounds of the formula $[R^5]^+[B(R^7)_4]^-$ wherein $R^5$ is a cyclic $C_{5-7}$ aromatic cation or a triphenyl methyl cation and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula $—Si—(R^9)_3$; wherein each $R^9$ is independently selected from the group consisting of a hydrogen atom and a $C_{1-4}$ alkyl radical;
   (ii) compounds of the formula $[(R^8)_tZH]^+[B(R^7)_4]^-$ wherein H is a hydrogen atom, Z is a nitrogen atom or phosphorus atom, t is 2 or 3 and Z is nitrogen or phosphorus and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and
   (iii) compounds of the formula $B(R^7)_3$ wherein $R^7$ is as defined above.

* * * * *